(12) United States Patent
Lipner

(10) Patent No.: US 7,118,610 B2
(45) Date of Patent: Oct. 10, 2006

(54) FOLDABLE FILTER FRAME

(76) Inventor: Brian Lipner, 333 Bosserman St., LaPorte, IN (US) 46350

( * ) Notice: Subject to any disclaimer, the term of this patent is extended or adjusted under 35 U.S.C. 154(b) by 190 days.

(21) Appl. No.: 10/727,394

(22) Filed: Dec. 4, 2003

(65) Prior Publication Data

US 2004/0148915 A1 Aug. 5, 2004

Related U.S. Application Data

(60) Provisional application No. 60/430,856, filed on Dec. 4, 2002.

(51) Int. Cl.
*B01D 46/10* (2006.01)

(52) U.S. Cl. .................... 55/495; 55/497; 55/501; 55/511; 55/DIG. 5; 55/DIG. 31

(58) Field of Classification Search ............ 55/495, 55/497, 499, 501, 511, DIG. 31, DIG. 5; 428/126, 136
See application file for complete search history.

(56) References Cited

U.S. PATENT DOCUMENTS

| | | | |
|---|---|---|---|
| 2,405,293 A * | 8/1946 | Verner | 55/DIG. 31 |
| 2,405,716 A * | 8/1946 | Schaaf | 55/DIG. 31 |
| 2,597,927 A * | 5/1952 | Endres | 55/DIG. 31 |
| 2,869,694 A * | 1/1959 | Breckheimer | 55/DIG. 31 |
| 3,023,839 A | 3/1962 | Best | |
| 3,031,047 A * | 4/1962 | Williams | 55/DIG. 31 |
| 3,467,257 A * | 9/1969 | Getzin | 55/495 |
| 3,793,692 A * | 2/1974 | Tate et al. | 55/DIG. 31 |
| 3,970,440 A | 7/1976 | Copenhefer et al. | |
| 4,086,071 A | 4/1978 | Champlin | |
| 4,105,423 A | 8/1978 | Latakas et al. | |
| 4,124,362 A * | 11/1978 | Westlin et al. | 55/DIG. 31 |
| 4,323,379 A * | 4/1982 | Shearin | 55/511 |
| 4,372,763 A | 2/1983 | Champlin et al. | |
| 4,420,315 A | 12/1983 | Kershaw | |
| 4,464,187 A | 8/1984 | Kershaw | |
| 4,561,587 A | 12/1985 | Wysocki | |
| 4,570,844 A | 2/1986 | Wysocki | |
| 4,636,233 A * | 1/1987 | Lizmore | 55/511 |
| 5,743,927 A | 4/1998 | Osendorf | |
| 5,800,588 A | 9/1998 | Miller | |
| 5,810,898 A | 9/1998 | Miller | |
| 5,846,603 A | 12/1998 | Miller | |
| 6,033,454 A * | 3/2000 | Hoeffken | 55/495 |
| 6,136,058 A | 10/2000 | Miller | |

(Continued)

OTHER PUBLICATIONS

International Search Report for Application PCT/US03/38484 (Apr. 21, 2004).*

*Primary Examiner*—Jason M. Greene
(74) *Attorney, Agent, or Firm*—Leydig Voit & Mayer, Ltd.

(57) ABSTRACT

A foldable filter frame is provided. The filter frame includes a filter media panel and a rectangular support frame surrounding the filter media panel. The support frame included four edge elements. Each edge element has a double-walled construction and is foldable into a position in which a first leg of the respective edge element is generally perpendicular to a second leg of the edge element. An end of at least one of the edge elements that defines a corner of the support frame supports a foldable tab that is receivable in a complementary slot in an end of the other edge element defining the respective corner of the support frame with the tab being arranged in an inner space between the double-walls of the edge element.

5 Claims, 8 Drawing Sheets

U.S. PATENT DOCUMENTS 6,209,724 B1 4/2001 Miller
6,267,796 B1 7/2001 Schottmer

* cited by examiner

FOLDABLE FILTER FRAME

FIELD OF THE INVENTION

This invention pertains to air filters used in heating and air conditioning systems.

BACKGROUND OF THE INVENTION

Forced air heating and air conditioning systems commonly include an air filter to remove particulates and other impurities from the circulating air. These air filters generally consist of a filter media (e.g., a fibrous mat or porous foam) that is held within a frame. The frame provides the air filter with mechanical strength and rigidity so as to facilitate mounting of the air filter in the air handling equipment. Frequently, these air filters must be replaced on a periodic basis. Alternatively, the air filters can be designed to be washable.

Unfortunately, the air filters that are commercially available for use in heating and air conditioning systems have a number of shortcomings. For example, the air filters are relatively expensive to transport and store because they are quite bulky despite their lightweight construction. This problem has been alleviated somewhat by filters having frames that are designed to nest in another filter thereby allowing more filters to be stored in a given shipping container. However, even with nestable filter designs, the transport and storage of the filters remains a significant cost issue. Moreover, nestable filter designs, as is the case with many conventional filter designs, tend to be expensive to manufacture, awkward to assemble and somewhat flimsy.

BRIEF SUMMARY OF THE INVENTION

A foldable filter frame is provided. The filter frame includes a filter media panel and a rectangular support frame surrounding the filter media panel. The support frame included four edge elements. Each edge element has a double-walled construction and is foldable into a position in which a first leg of the respective edge element is generally perpendicular to a second leg of the edge element. An end of at least one of the edge elements that defines a corner of the support frame supports a foldable tab that is receivable in a complementary slot in an end of the other edge element defining the respective corner of the support frame with the tab being arranged in an inner space between the double-walls of the edge element.

DETAILED DESCRIPTION OF THE INVENTION

Figure 1:
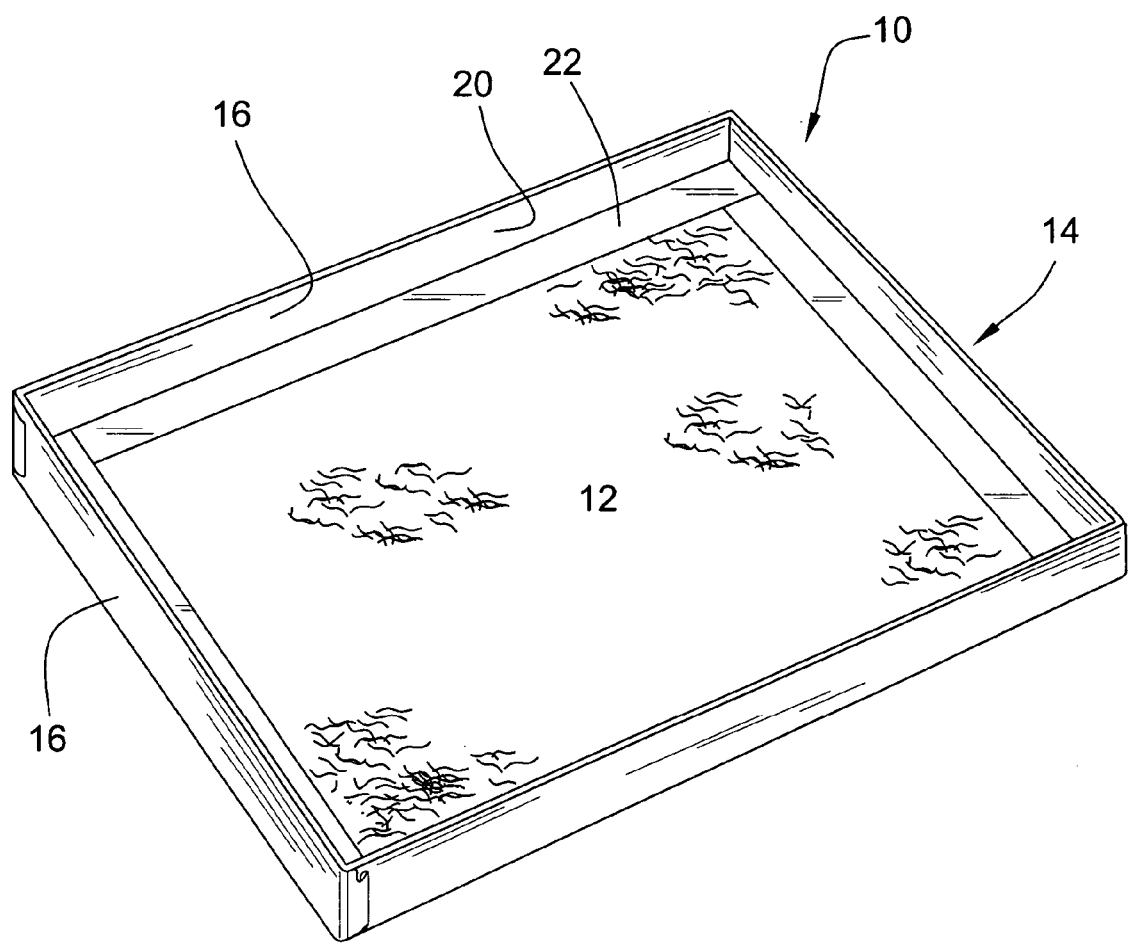
FIG. 1 is a perspective view of an air filter constructed in accordance with the present invention.

Referring more particularly to FIG. 1, an air filter assembly 10 is shown that is suitable for use in a heating or air conditioning system. The illustrated filter assembly consists of a filter media panel 12 that is contained within a surrounding support frame 14. The illustrated filter media panel 12 has a generally planar construction. Alternatively, the filter media can have a pleated or corrugated configuration. Moreover, any suitable filter media can be used including a fibrous fiberglass mat, porous foam or the like.

In this case, the support frame 14 comprises four side or edge elements 16 that together define the open center portion through which a fluid such as air can flow to the filter media panel 12. The filter media panel 12 is attached to the edge elements 16 of the support frame 14 using any suitable method (e.g., glue, staples or the like). Advantageously, while their lengths may vary depending on whether the filter is square or rectangular, each of the edge elements 16 has the same configuration. As will be appreciated, this can substantially reduce the cost of manufacturing the support frame.

To maximize the number of filters that can be stored in a given container, the support frame 14 is constructed such that it can lie flat for shipping purposes and then be folded into a more rigid box frame (see FIG. 1) prior to installation. To this end, a fold or score line 18 extends lengthwise through the middle of each of the edge elements 16 (see FIG. 2). The score lines 18 facilitate folding of a first leg 20 of the individual edge elements 16 into a position in which it is perpendicular relative to a second leg 22 of the respective edge element to which the filter media panel 12 is attached thereby forming an L-shape as shown in FIG. 3. The support frame 14 is preferably made of a material such as paperboard that is sufficiently flexible to allow the frame to be readily folded.

As is the case with the illustrated embodiment, the edge elements 16 of the support frame 14 can have a double-walled construction. This double-walled construction along with the L-shaped configuration of the folded edge elements 14 (see FIGS. 1 and 4) makes the fully assembled filter assembly 10 rigid and strong. As will be appreciated, this strength and rigidity makes the filter assembly easier to handle and install.

Figure 2:
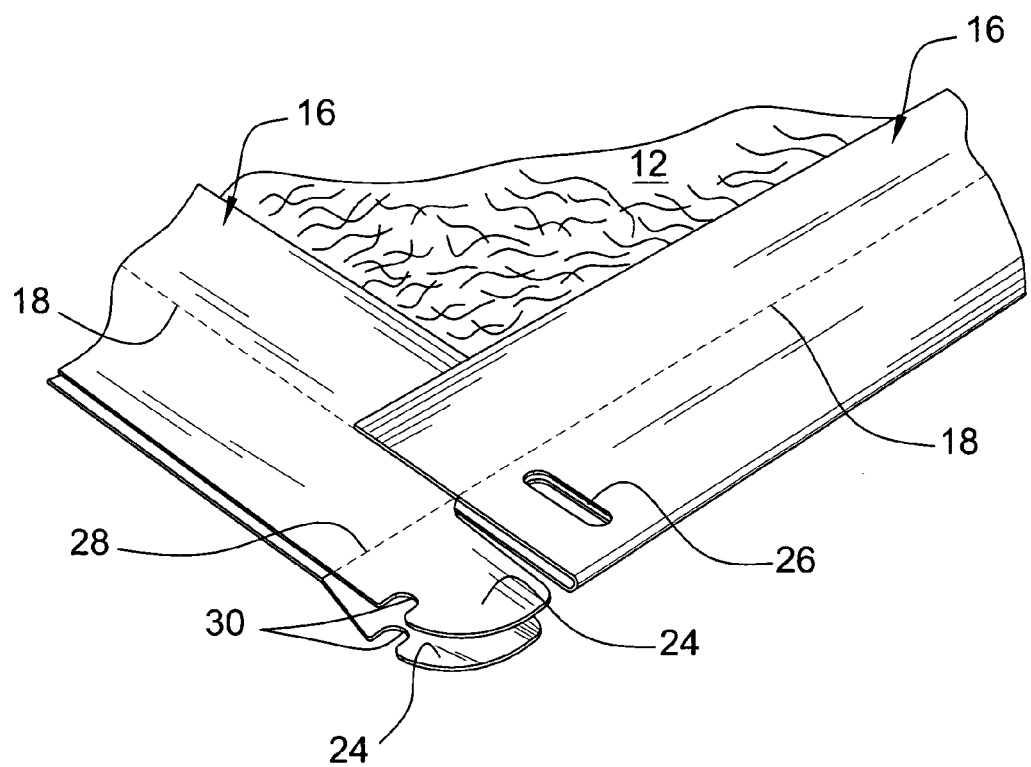
FIG. 2 is an enlarged perspective view of one corner of the air filter of FIG. 1 showing the corner in an unassembled condition.
Figure 3:
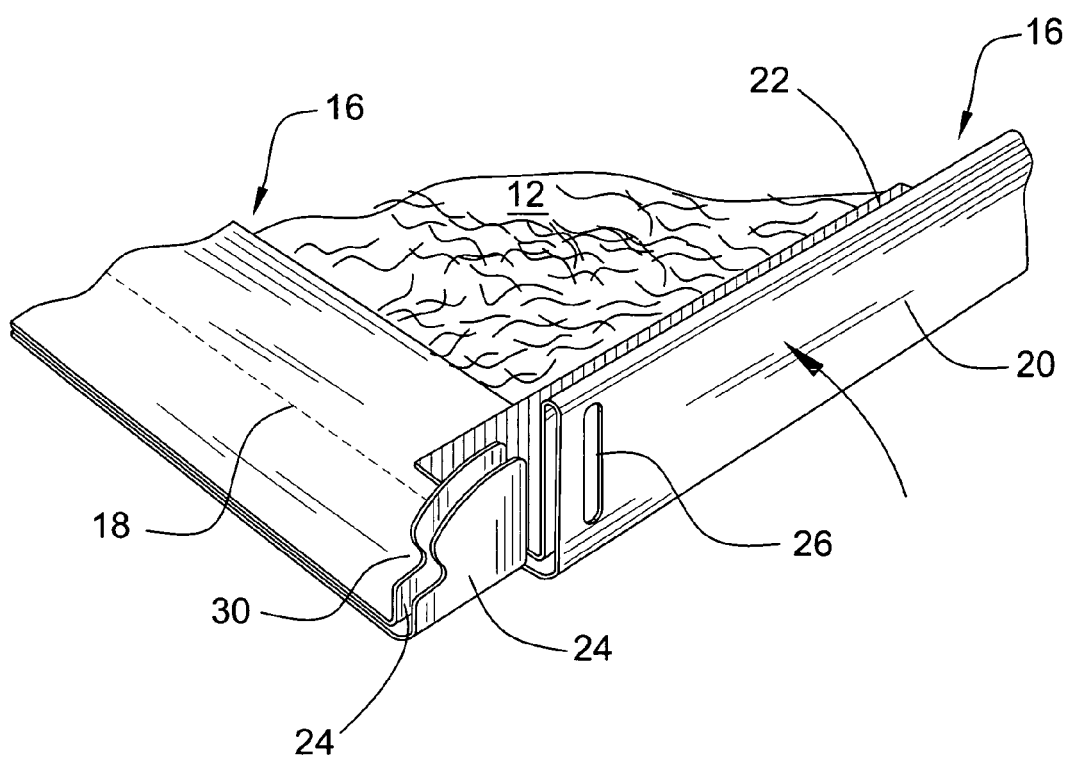
FIG. 3 is an enlarged perspective view of one corner of the air filter of FIG. 1 showing the corner in a partially assembled condition.
Figure 4:
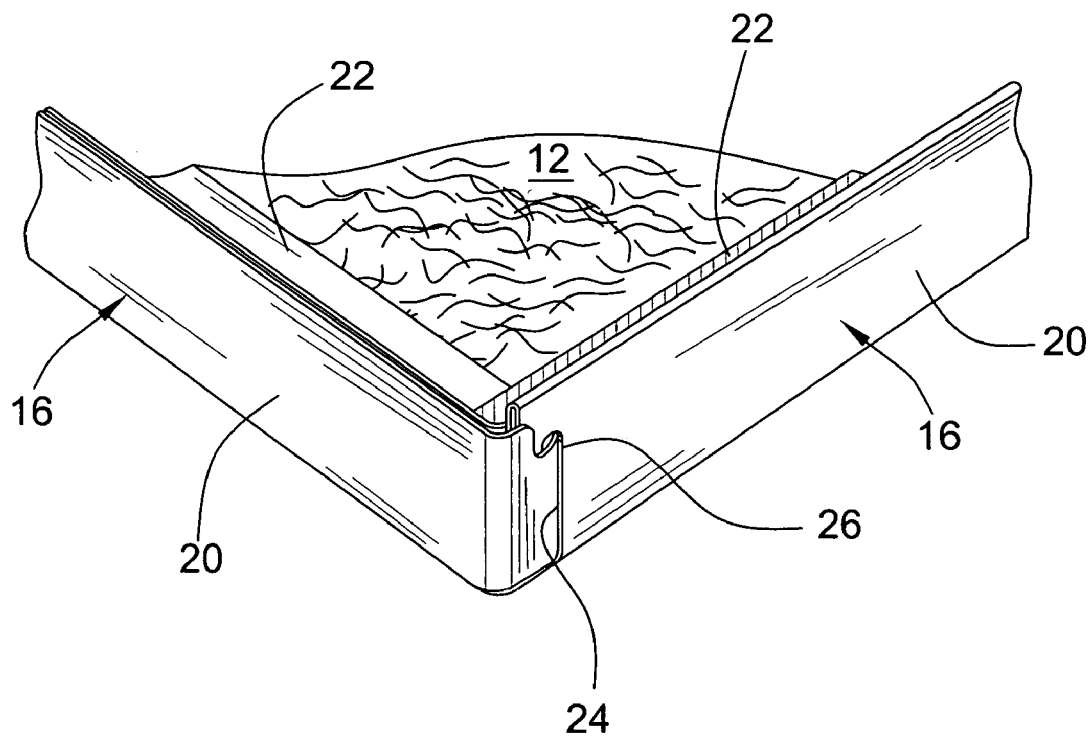
FIG. 4 is an enlarged perspective view of one corner of the air filter of FIG. 1 showing the corner in a fully assembled condition.

To secure the corners of the support frame 14, the end of one of the edge elements 16 defining each corner includes a pair of tabs 24 that are received in a pair of complementary slots 26 formed in the end of the other edge element 16 defining the corner (see FIGS. 2–4). As noted above, each of the edge elements 16 has the same configuration, which in this case comprises a first "male" end including tabs 24 and a second "female" end including slots 26. As best shown in FIG. 2, each tab 24 is connected to the rest of its respective edge element 16 along a transverse fold or score line 28 that facilitates bending of the tab 24 relative to the rest of its corresponding edge element 16.

To assemble one of the corners, the tabs 24 are bent along the score line 28 into perpendicular relation with the remainder of their corresponding edge element 16 as shown in FIG. 3. If it has not already been done, the two contiguous edge elements 16 that will form the corner are then folded along their longitudinal score lines 18 so that the first and second legs 20, 22 of each of the edge elements 16 forms an L-shape. In this case, a slot 26 is provided in the inside facing wall and in the outside facing wall of the perpendicular first leg 20 of the "female" edge element end forming the corner. Accordingly, the two tabs 24 of the contiguous "male" edge element end are split with one of the tabs 24 extending into the slot 26 on the outside face of the first leg 20 and the second tab extending into the slot 26 on the inside face.

Because of the double-walled construction of the edge elements 16, the tabs 24 are received in the inner space between the two walls when inserted in the slots 26. As a result, the majority of the tabs 24 are hidden when the filter support frame 14 is assembled so as to ensure that they do not become snagged or otherwise damaged in such a manner that the corners become unfastened.

To secure the tabs 24 in the slots 26, each tab 24 has a notch 30 formed in an upper edge thereof that engages the upper corner of its associated slot 26 when the tab 24 is fully inserted. This locks the tab 24 in the slot 26 making the tab resistant to being pulled out of engagement. Thus, when assembled, the corners of the support frame 14 are rigid and strong. While the use of two tabs at each corner is advantageous in that it increases the strength of the corners, it will be understood that each corner also could be equipped with only a single tab.

Figure 5:
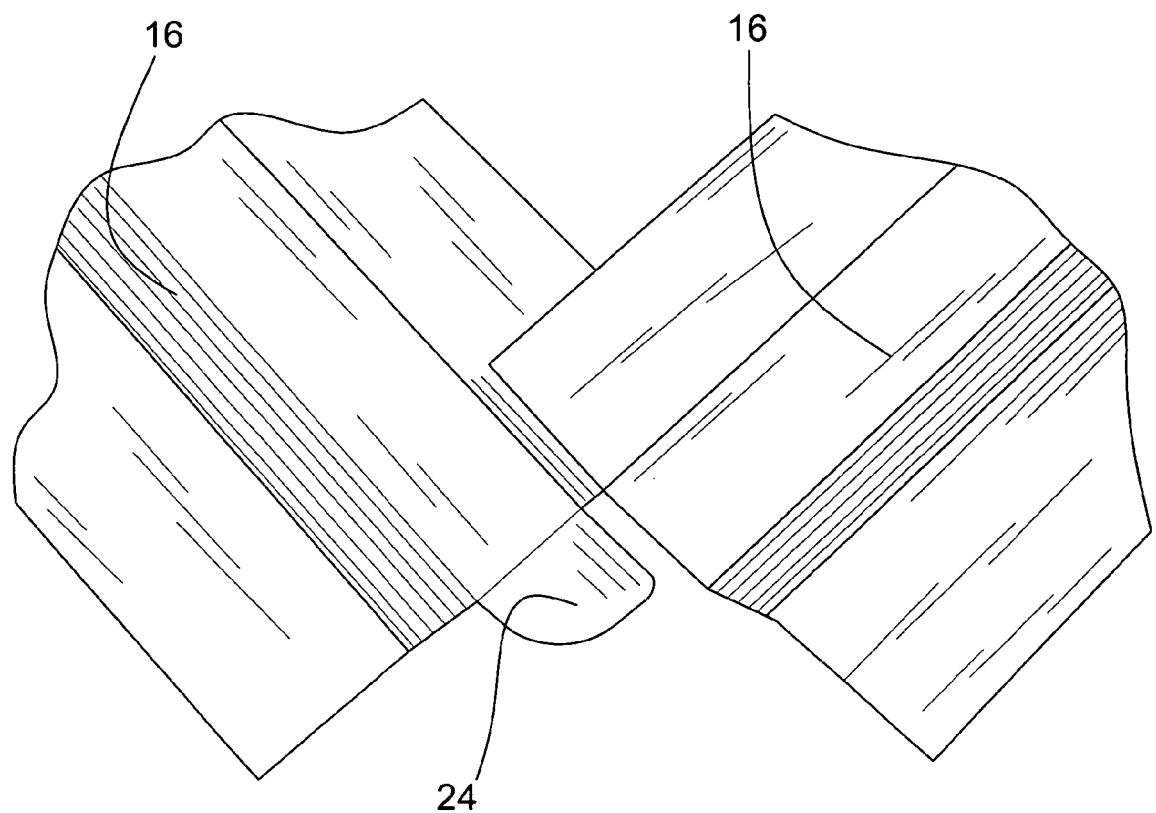
FIG. 5 is an enlarged perspective view of one corner of a second embodiment of an air filter constructed in accordance with the present invention.
Figure 6:
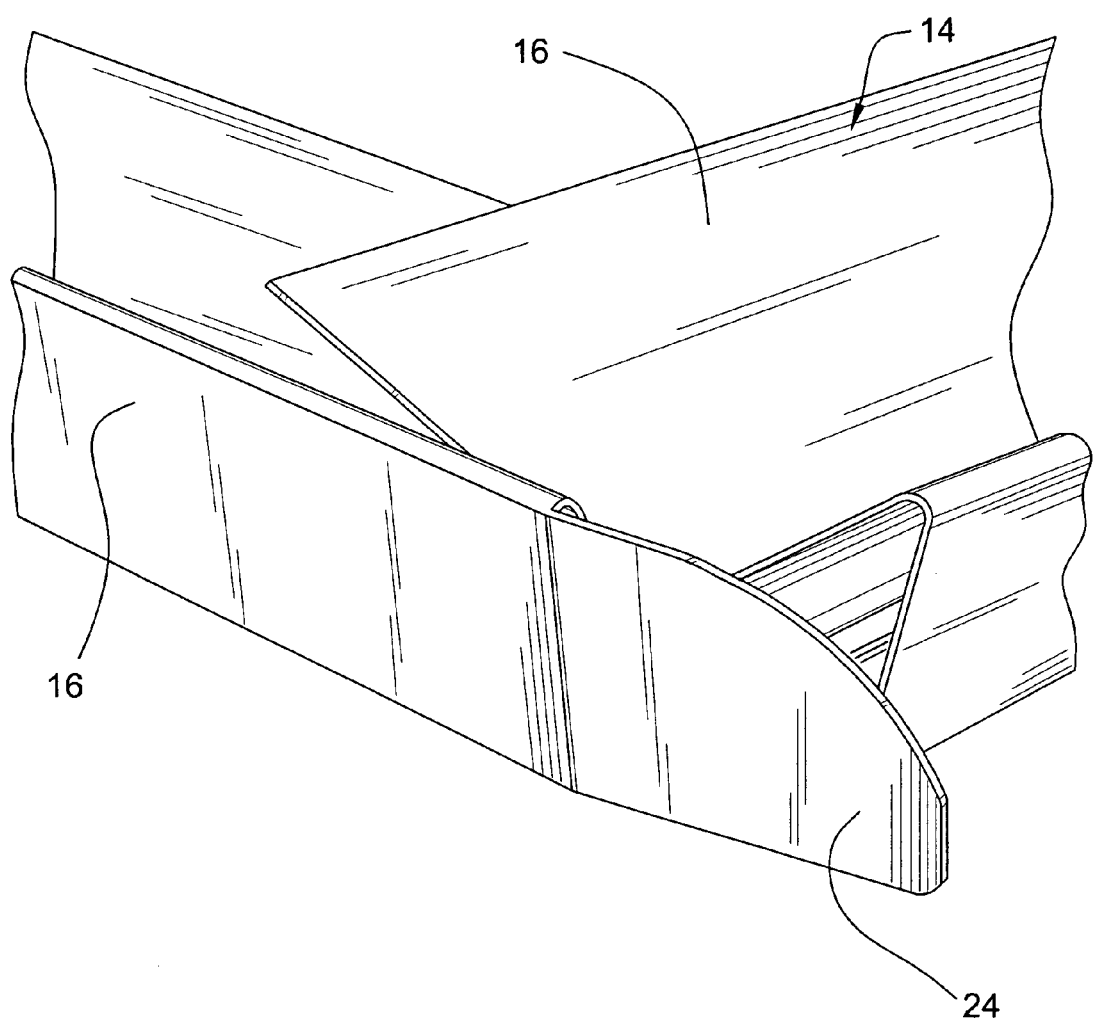
FIG. 6 is an enlarged perspective view of one corner of the air filter of FIG. 5 showing the corner in a partially assembled condition.
Figure 7:
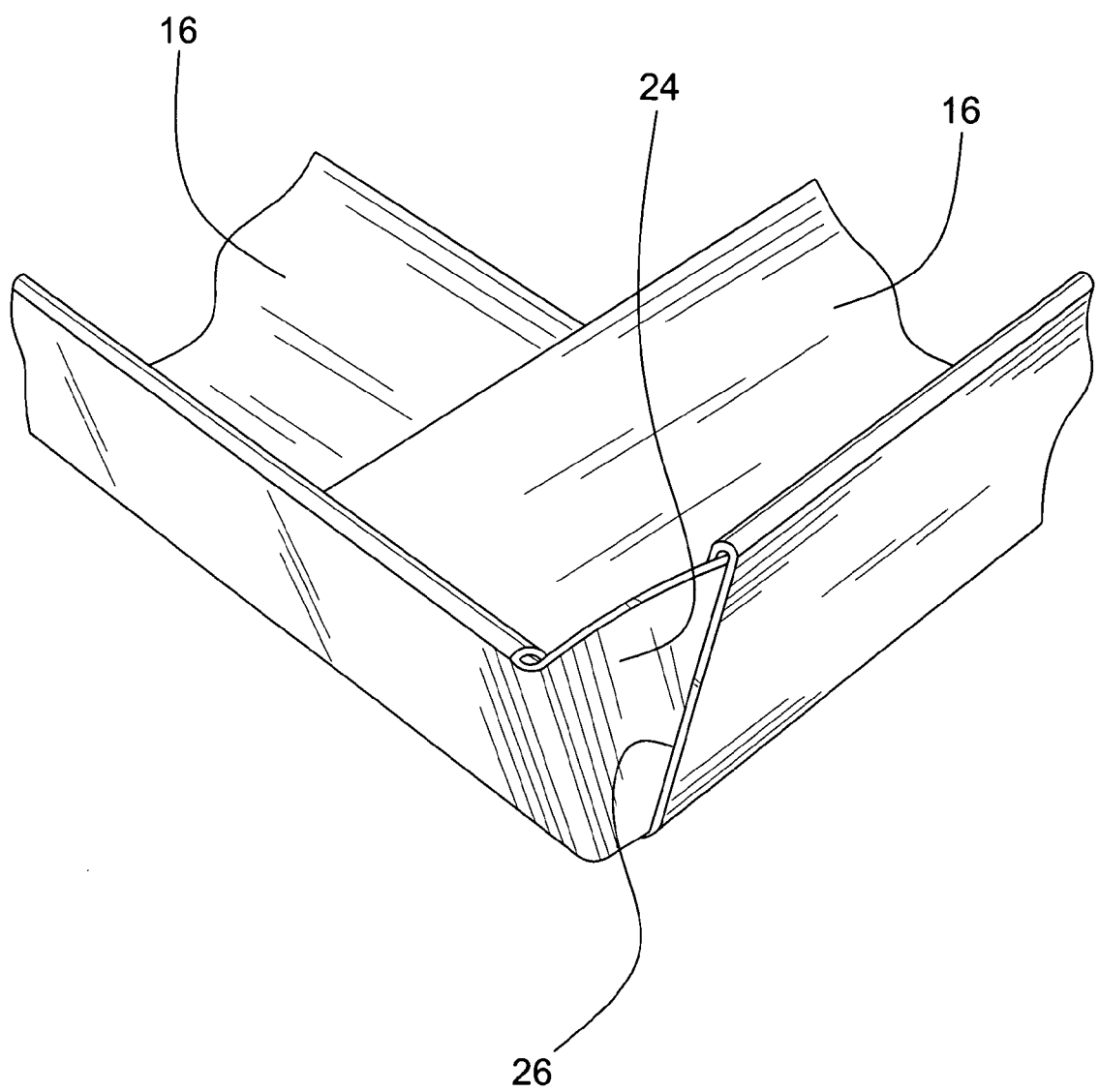
FIG. 7 is an enlarged perspective view of one corner of the air filter of FIG. 5 showing the corner in a partially assembled condition.
Figure 8:
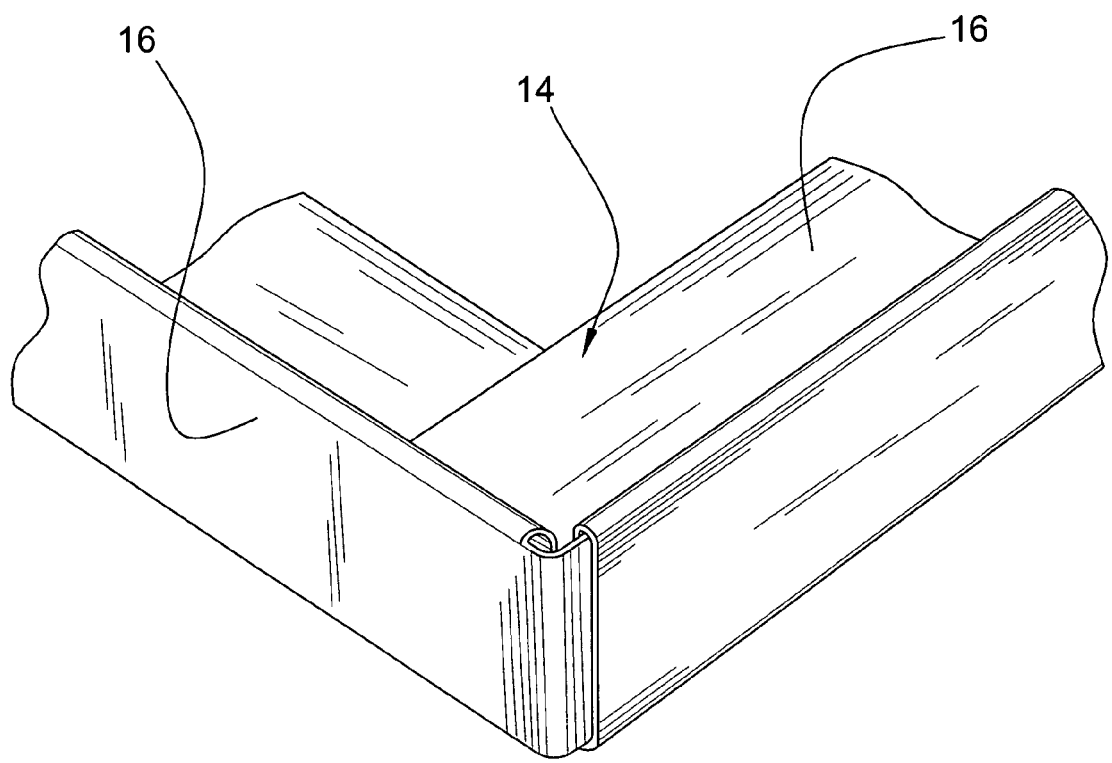
FIG. 8 is an enlarged perspective view of one corner of the air filter of FIG. 5 showing the corner in a fully assembled condition.

A second embodiment of an air filter assembly is shown in FIGS. 5–8. As with the FIGS. 1–4 embodiment, the air filter assembly shown in the photos can be stored in a flat condition and then folded into a box-like construction for installation. The primary difference between the first and second embodiments lies in the fastening of the corners once the edge elements 16 have been folded. As shown in FIGS. 5 and 6, in the second embodiment, a single tab 24 is provided on one of the edge elements 16 defining each corner. The tab 24 is received in a slot 26 formed in the end of the other edge portion that defines the corner (see FIG. 7). In this case, the slot 26 is formed by the two walls of the folded-up portion of the edge element 16 of the support frame 14.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A foldable filter frame comprising in combination:
a filter media panel; and
a rectangular support frame surrounding the filter media panel, the support frame including four edge elements, each edge element having at least two sidewalls and being foldable into a position in which a first leg of the respective edge element is substantially perpendicular to a second leg of the edge element, an end of at least one of the edge elements that defines a corner of the support frame supporting a foldable tab that is receivable in a complementary slot in one of the sidewalls of the other edge element defining the respective corner of the support frame with the tab being arranged in an inner space between the two sidewalls of the edge element.

2. The foldable filter frame of claim 1 wherein the filter media panel is planar.

3. The foldable filter frame of claim 1 wherein the tab includes a notch that engages an upper corner of the complementary slot when fully inserted therein.

4. The foldable filter frame of claim 1 wherein the end of the at least one edge element supports a pair of tabs each of which is receivable in an associated complementary slot in in a respective one of the sidewalls of the other edge element defining the respective corner of the support frame.

5. The foldable filter frame of claim 1 wherein each edge element has a first end supporting a tab and a second end having a complementary slot.

* * * * *